United States Patent [19]

Li

[11] Patent Number: 5,385,645
[45] Date of Patent: Jan. 31, 1995

[54] HEAT TRANSFER APPARATUS WITH POSITIVE DRIVE ORBITAL WHIP ROD

[75] Inventor: Yao-Tzu Li, Lincoln, Mass.

[73] Assignee: Y. T. Li Engineering, Inc., Acton, Mass.

[21] Appl. No.: 81,039

[22] Filed: Jun. 22, 1993

Related U.S. Application Data

[63] Continuation-in-part of Ser. No. 716,083, Jun. 17, 1991, Pat. No. 5,221,439.

[51] Int. Cl.$^6$ .......................... B01D 1/24; F28F 17/00
[52] U.S. Cl. ..................................... 202/175; 202/236; 202/236; 202/237; 202/269; 62/354; 159/13.2; 159/900; 159/DIG. 7; 165/94
[58] Field of Search ............... 202/175, 236, 237, 269; 159/13.2, 6.2, DIG. 7, 900; 165/94; 62/354

[56] References Cited

U.S. PATENT DOCUMENTS

| | | |
|---|---|---|
| 3,190,817 | 6/1965 | Neugebauer et al. . |
| 3,250,687 | 5/1966 | Frank .............................. 159/DIG. 7 |
| 3,271,272 | 9/1966 | Watt ..................................... 202/236 |
| 3,328,972 | 7/1967 | Svanoe . |
| 4,230,529 | 10/1980 | Li ........................................ 202/175 |
| 4,441,963 | 4/1984 | Li ........................................ 202/172 |
| 4,468,930 | 9/1984 | Johnson ................................ 62/71 |
| 4,504,361 | 3/1985 | Tkac et al. ........................ 202/236 |
| 4,551,159 | 11/1985 | Goldstein ............................. 62/541 |
| 4,618,399 | 10/1986 | Li ........................................ 159/6.2 |
| 4,762,592 | 8/1988 | Li ........................................ 202/172 |
| 4,781,245 | 11/1988 | Freychet et al. ..................... 165/94 |
| 4,796,441 | 1/1989 | Goldstein ............................. 62/354 |
| 5,165,469 | 11/1992 | Smith ................................... 62/354 |
| 5,221,439 | 6/1993 | Li et al. ............................... 202/205 |

OTHER PUBLICATIONS

Electric Power Research Institute Journal, "Cool Storage: Saving Money and Energy", Jul./Aug. 1992, pp. 14-21.

Product Brochure of Calmac Manufacturing Corporation, "an Introduction to Off-Peak Air Conditioning OPAC for Commercial Applications", pp. 1-8 Feb. 1991.

Product Brochure of Carrier, "Encapsulated Ice Storage", pp. 1-5 Dec. 1991.

Holusha, J., New York Times, "Keeping Buildings Cool With Greater Efficiency", Sep. 27, 1992.

Primary Examiner—Wilbur Bascomb, Jr.
Attorney, Agent, or Firm—Dike, Bronstein, Roberts & Cushman

[57] ABSTRACT

A heat transfer apparatus for processing a liquid continuously has a positive mechanical drive for a set of vertical whip rods each disposed in a vertical heat transfer tube. Each whip rod is free-standing on its lower end and is sufficiently flexible to conform closely to the inner surface of the tube as it orbits. The orbital drive propels the whip rod directly through a pair of horizontal, vertically spaced plates that engage the rods in loose openings that serve as fluid inlets from the drive plate. A motor rotates a drive shaft coupled to at least one of the drive plates through at least one eccentric crank. Each plate can be an opposed pair of plates with a separate eccentric drives 180° out of phase with one another for a self balancing. Another form of drive plate uses a rigid circular ring that mounts rod-engaging sleeves via a network of wires supported by the ring. Fluid distribution can also be from a water supply held between a fixed plate and the upper drive plate with gravity feed to each tube through a properly sized inlet opening in the upper tube end. To isolate the heat transfer process, various seals are used to transmit rotary power through a housing without conventional rotary seals.

15 Claims, 4 Drawing Sheets

HEAT TRANSFER APPARATUS WITH POSITIVE DRIVE ORBITAL WHIP ROD

REFERENCE TO RELATED APPLICATIONS

This application is a continuation-in-part of U.S. Ser. No. 07/716,083 filed Jun. 17, 1991, now U.S. Pat. No. 5,221,439.

BACKGROUND OF THE INVENTION

This invention relates in general to heat transfer apparatus for evaporating, distilling, freezing or chilling liquids, and more specifically, to an orbital drive for a whip rod used in conjunction with a vertical tube type of heat transfer apparatus.

In the processing of liquids it is often required to evaporate the liquid, as in the production of fresh water from seawater, in distillation processes, and in the production of ice slurries and other cooled or slushy liquids. Ice slurries are useful, among other applications, for cold storage to reduce peak load power demands in building air conditioning systems and to provide refrigeration for food such as fish catches stored on fishing vessels.

Traditional evaporation and distillation apparatus, without or without vapor compression, require high energy inputs to heat fluids and drive compressors. Also, since evaporation or condensation occurs primarily at the interface between the liquid and its vapor, heat must traverse a container wall and a layer of the liquid to reach this interface. As a result, there is a substantial temperature gradient per stage in conventional evaporation apparatus. This limits the number of stages that can be provided for a given temperature rise, or requires a greater energy input.

U.S. Pat. Nos. 4,230,529 and 4,441,963 issued to the present applicant disclose a new approach to solving these problems. It involves using a vertical, thin-walled, open-ended heat transfer tube (or tubes) which is driven in an orbital or wobbling motion. This orbital tube motion increases the heat transfer efficiency by reducing the thermal resistance at the inner and outer surfaces of the tube. The motion swirls the liquid to be evaporated into a generally thin film over the inner surface of the tube. This increases the evaporation surface area and decreases the thermal resistance by decreasing the thickness of the liquid layer. The orbital motion also aids in heat transfer into the tube at its outer surface produced by condensation of a heated vapor stream. The condensation increases the thickness of the liquid layer at the outer surface, and hence its thermal resistance. The orbital motion throws off the droplets, thereby increasing the heat transfer at the outer wall.

Both of these patents teach multiple such tubes held in a common container and driven by eccentrics to underdo a wobbling motion in a horizontal plane. The liquid is driven in turn by a dynamic coupling to revolve over the inner surface as it flows down the tube under the influence of gravity. These arrangements require cranks, bearings and complicated seals inside the evaporator. The component parts are difficult and costly to manufacture and assemble, they must be machined to close tolerances, they are susceptible to corrosion and contamination when used in the chemical industry, and they wear which leads to a deterioration in the balance of the wobbling tubes and attendant vibrations. The '529 patent also discloses a self balancing arrangement with a self adjusting orbital radius that accommodates the balance to changes in mass. If the base moves, the crank radius, however, must be fixed, and even this step may not be adequate.

Many known heat transfer devices ranging from ice cream makers to sophisticated evaporators use a rigid wiper bar that is positively driven to rotate within the tube to spread viscous liquids into a thin, evenly distributed film. Positively driven wipers can handle fluids with a viscosity of 1,000,000 c.p. or higher. (Water has a viscosity of 1 c.p.) However, any rigid, positively driven wiper or scraper has drawbacks. First there is a need to introduce and seal a rotational drive shaft. Second, because the wiper or scraper is rigid and moving over a fixed surface at close spacings, manufacturing and assembly become difficult and costly. The surface must be machined to close tolerances, as well as the wiper/scraper and its support structures. Further, these rigid wiper arrangements are susceptible to, and comparatively intolerant of, wear.

To solve these problems for less viscous fluids, e.g. those with a viscosity of 1 to 1,000 c.p., the '399 patent describes a whip rod located in the tube which spreads the feed liquid into a highly thin and uniform film to reduce its thermal resistance and to enhance its evaporation. The whip rod also controls the build up of solid residue of evaporation. The '399 patent discloses several arrangements for mounting the rod, including lengths of cables, a flexible, but non-rotating anchor connected between a base and the lower end of the rod, and a double universal joint also connected between the lower end of the whip rod and the base. While the whip rod is effective as a film distributor, the mounting arrangements have disadvantages. They increase the overall material, assembly and operating costs. Also, they fail. Material fatigue of flexible cables supporting the whip rods is a particular concern.

U.S. Pat. No. 4,762,592 describes an orbital drive that overcomes the manufacture, assembly, wear and balance problems of the earlier eccentric-crank drives. This improved drive uses a rotating counterweight or weights mounted on the evaporator and a spring-loaded strut suspension for the evaporator. The counterweights and the mass of the evaporator revolve around one another as the counterweights rotate.

While this arrangement does overcome the problems associated with an eccentric crank drive, it also suffers from certain deficiencies. For example, it requires the orbital movement of a large mass, particularly where the unit is scaled up to a commercial size with multiple large tubes, each carrying a liquid stream. This mass increases the power requirements (particularly on start up), increases the demands on the spring-strut suspension, can lead to an early fatigue failure of the suspension, and generally increases the construction and operation cost of the system. It also increases the desirability of a stable operating platform, e.g. a concrete floor, as opposed to one that moves such as a ship at sea or some other transport. While the '592 patent proposes a solution to the moving platform problem, the solution in practice has not been adequate when the apparatus has been scaled up to commercially useful sizes.

Another design consideration is the requirement in certain applications to maintain the fluid being processed in a totally sealed environment, e.g. one that is aseptic. But because a heat transfer device uses continuous processing, there are seal and other problems in conducting the fluids flowing between the orbital system and the fixed surrounding environment and in introducing motive force. Conduits must be flexible to at least a certain degree to accommodate the orbital motion, but maintaining this flexibility becomes increasingly problematic as the system is scaled up in size. Ideally there are no sliding rotary seals since they are difficult to maintain with the required degree of reliability in the seal, particularly as they wear.

While the orbital tube approach has been used for evaporation and distillation, heretofore it has not been applied for freezing. One reason is that the liquid freezes to the heat transfer surface and greatly reduces any performance advantages of the orbital tube approach.

It is therefore a principal object of this invention to provide an orbital drive for use with vertical heat transfer tubes that drive a comparatively small mass, has lower power consumption as compared to known orbital tube systems, and which can operate readily on a moving platform.

Another principal object is to provide these results with an apparatus that can be readily scaled up in size.

A further object is to provide the foregoing advantages without critical machining of parts or carefully controlled assembly.

A still further object is to provide the foregoing objects with while being substantially insensitive to wear of parts in the drive.

Another object is to provide the foregoing advantages while also providing compatibility with simple and reliable arrangements for distributing the liquid being processed to multiple tubes.

A further object is to provide the foregoing advantages while also sealing the fluid being processed, including sealing without sliding rotary seals.

Another object is to provide the foregoing advantages for heat transfer equipment used for evaporation, distillation, chilling and freezing.

SUMMARY OF THE INVENTION

A liquid processing heat transfer apparatus such as an evaporator or distiller feeds a liquid into at least one generally vertical, thin-walled, open-ended heat transfer tube at its upper, inner surface. An outer tube or housing surrounds each heat transfer tube or tubes to define a chamber. In evaporation and distillation, a flow of a heated vapor over the outer surface of the heat transfer tube condenses at least in part. The resulting inward radial heat flow through the heat transfer tube causes an evaporation of the liquid on the inner tube surface. For chilling or freezing, a refrigerant flows over the outer surface resulting in an outward radial heat flow that freezes the process liquid at the inner surface.

A whip rod is located inside each tube. It is preferably free-standing on its lower end, supported directly or indirectly on a horizontal plate spaced below the tube or tubes. The rod is formed of a material and configured so that it flexes to conform to the inner surface when whipped about the inner surface. In one form it has a low friction slider secured on its lower end. In another form it connects through a ball and socket joint, or an equivalent, to one end of a link that pivots at its lower end in a socket or the like formed in, or mounted on, the plate.

A direct, positive orbital drive propels the whip rod or rods to move in an orbital motion. In sharp contrast with prior orbital tube type heat transfer equipment the heat transfer tube or tubes are stationary. The whip rod or rods orbit within them. Each rod distributes the liquid over the inner surface. A preferred arrangement for the positive rod drive includes a pair of vertically spaced, horizontal plates that hold the rod or rods freely in aligned openings in the plates. A set of eccentric cranks drive the plates in an orbital motion, which is coupled to the rods via the plates. Each plate can also have an hourglass or figure eight shape. Two such plates can be orthogonal to one another, each with its own drive shaft and eccentrics set to operate 180° out of phase with one another to achieve a self balancing. Rotary power can be coupled to the cranks by sliding rotary seals mounted in the housing. To avoid sliding rotary seals, an internal shaft can be driven with a magnetic coupling or via a conduit that couples torsionally between an external source of motive power and drive elements fluid sealed within a flexible hose.

Another form of orbital drive secures a rod or an array of rods in a pair of vertically spaced, horizontally extending networks of wires or the like extending from a rigid ring to each of the rods. To introduce the orbital motion without rotary seals, two pairs of radially oriented, opposed drive elements connected to an outer housing by bellows seals or the like. They operate in a synchronized manner to transform linear motion into an orbital motion that propels the ring, and thus the rods connected to the ring.

A fluid distribution system for multiple tubes can include feeding a supply of the liquid to be processed to the upper horizontal drive plate where it simply flows over the plate, or via weirs, to the openings that engage the upper ends of the drive rods. This distribution system can work because the tubes are stationary, and therefore the feed water supply does not need to orbit. The liquid gravity feeds through the opening to the underlying tubes. The motion of the rods in the openings prevents them from clogging, even when the liquid is an ice slurry, fruit juice concentrate, or other solid-liquid mixture.

The system can also use annular walls mounted on the drive plate and surrounding an associated tube with a feed hole or notch formed in the wall. An equivalent feed system can also be formed by mounting the heat transfer tubes so that their upper ends project above a fixed horizontal plate and contain openings to allow a feed flow at a rate in part determined by the area of the opening. Wear in the drive, e.g. a the drive plate holes or in bearings, has substantially no adverse impact on the performance of the apparatus.

These and other features and objects will be more fully understood from the following detailed description which should be read in light of the accompanying drawings.

DETAILED DESCRIPTION OF THE PREFERRED EMBODIMENTS

Figure 1:
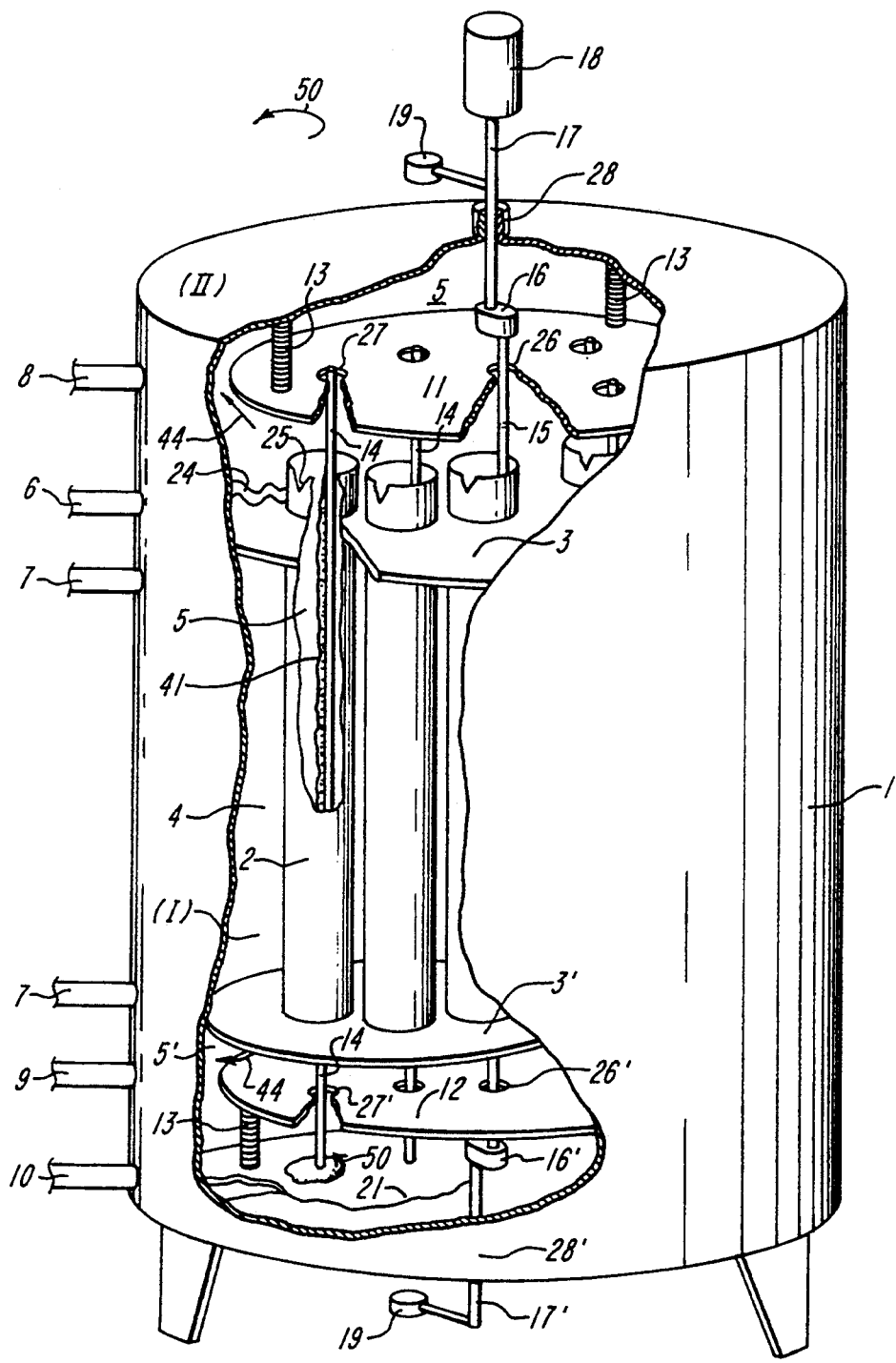
FIG. 1 is a view in perspective of an orbital rod heat transfer apparatus according to the present invention where multiple heat transfer tubes are stationary and an orbital drive is positively coupled to the whip rods.

FIG. 1 shows a heat transfer apparatus 100 that uses an orbital whip rod drive according to the present invention. A container or outer shell 1 encloses a number of heat transfer tubes 2. A top tube sheet 3 and a lower tube sheet 3a together with the tubes 2 divide the inside volume of container 1 into two compartments 4 and 5. Compartment 4 represents the outer or shell side of the heat transfer system. Compartment 5, the tube side, includes both an upper chamber 5a and a lower chamber 5b as well as the space inside all of the tubes 2. Each tube 2 provides inner and outer heat transfer surfaces. It is thin-walled and made of a material with high heat transfer properties such as copper or steel. The tube may have certain surface treatments such as grooving that may be used to enhance the heat transfer properties for either the inside or the outside surfaces of the tube. A first process media I may be introduced into chamber 4 via outlets 7 and 7a to exchange heat through the wall of the heat transfer tubes 2 with a second process media II, which may be introduced into the upper chamber 5 via inlets 6, 8, as well as 9 and 10 at the lower chamber 5a. For example, for desalinization, the media II is seawater and media I is a heated vapor such as steam. For making ice slurries, media II is water with an additive that reduces the adherence of ice crystals to the inner tube surface and media I is a pressurized refrigerant that boils at the outer surface to form a vapor/foam stream. A suitable additive for water is ethylene glycol (automotive antifreeze), milk, seawater, calcium magnesium acetate, and certain inorganic salts such as sodium bicarbonate that form anhydrous crystals. A 10% solution is typical. Successful additives result in the formation of very fine, powdery ice crystals. Additives that do not work form ice crystals as large, flat flakes.

When the apparatus 100 is used in an evaporation process, the media I in the chamber 4 having a higher temperature will be used to evaporate a second media II inside chamber 5 having a lower temperature. In particular, steam may be introduced into chamber 4 via conduit 7 and upon condensing onto the outside surface of tube 2 it will relieve the latent heat by forming some condensate to flow out from the outlet 7a. The heat thus released will be used to evaporate the media II, a fluid introduced into the upper chamber of 5 via conduit feeding to the top of the tube sheet 3. In one form of feed distribution, it will be distributed over tube sheet 3 in the form of a liquid pool 24. This liquid will then flow down the tube via the notches 25 to the inside surface of tube 2 as a liquid stream 41. The latent heat released by the condensation of the steam inside chamber 4 will pass through the wall of tube 2 to evaporate the liquid stream 41 inside the tube to generate vapor 44 which may flow either from the upper end of tube 2 and exit from outlet 8, or in another arrangement to flow downward of tube 2 concurrent with the flow of the liquid stream 41 to flow out from the outlet 9 at the lower end of chamber 5.

Inside each of tube 2 there is a whip rod 14 which is driven to revolve in an orbital manner inside tube 2 to push the liquid stream 41. The orbital motion is represented by curved arrows 50. This orbital motion will generate a centrifugal force to cause the whip rod to bear upon the inside surface of tube 2 to spread the liquid stream 41 into a thin and uniform liquid film to facilitate its evaporation and thereby to increase the heat transfer coefficient.

The mass of the rod, the property of the surface condition of the rod and that of the tube, as well as the revolving speed of the rod should be adjusted to accomplish the objectives of its various applications.

For instance, for seawater desalination, one desirable feature would be to let the orbital motion of the rod to minimize the scale forming tendency of the various ingredients dissolved in the seawater which may precipitate out to form scale while the water is evaporated. In the case of the concentration of some food products, the rod should be able to push the concentrated fluid against its viscosity while at the same time not damaging delicate material inside the concentrate. For making ice slurry the direction of the flow of the heat will be from the inside of the tube to its outside so that ice crystals form as the liquid is chilled and flows downwardly. For this application the function of the rod will be to dislodge the incipient formation of ice crystal that may stick to the inside surface of tube 2.

In the configuration of FIG. 1, the rods 14 are preferably free-standing inside the tubes 2 with their lower ends resting upon a plate 21 with some suitable low friction surface for the rods to slide upon to perform the orbital motion 50. In the preferred form, this orbital motion of the rods 14 is actuated by a pair of vertically spaced, horizontally extending plates 11,12. These plates are supported on flexible shafts 13 and 13a which are anchored at one end to the end covers 1a, 1b of the shell 1 and at the other end to the plates 11 and 12. These flexible shafts 13 and 13a are rigid in their torsional mode, but flexible in their bending mode. A universal joint would function in the same manner. Suspended in this manner, plates 11 and 12 will have freedom for translational motion but not for torsional motion. At the center of plates 11 and 12, there are bushings 26 and 26a through which a shaft 15 passes through and is driven to revolve by cranks 16 and 16a attached to a center shaft 17 and 17a, which in turn is driven by motor 18 through bearings and seals, 28 and 28a mounted on the container 1. Thus when the motor 18 operates it produces an orbital motion of the plates 11, 12 which then drive all the rods 14 captured in the holes 27 in a similar orbital motion. The radii of the cranks 16 and 16a are adjusted so that the orbital rods 14 will orbit freely inside tubes 2. The diameter of the holes 27 is considerably larger than the diameter of the rods 14 to allow each rod to make its own adjustment while it orbits inside the tube 2.

Figure 2:
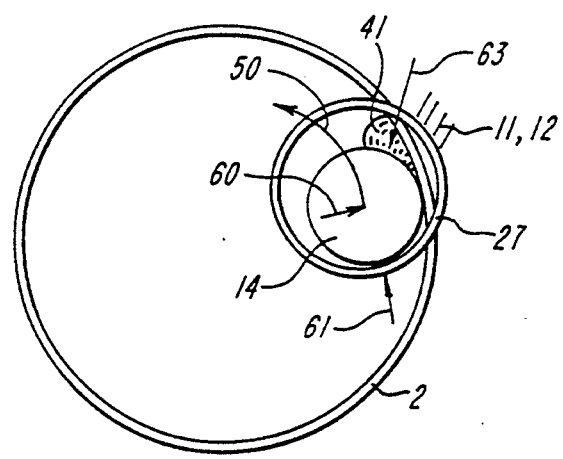
FIG. 2 is a simplified view in horizontal section of a heat transfer tube and orbiting whip rod illustrating the dynamic forces acting on the rod and the liquid in the tube.
Figure 2A:
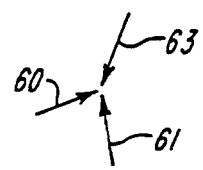
FIG. 2A is a force vector diagram showing the dynamic forces acting in FIG. 2.

FIG. 2 shows the principal dynamic forces involved in the operation of the orbital rod device. Force 60 is the centrifugal force of rod 14 driven to revolve inside tube 2 by force 61 derived from the movement of the openings 27 of plates 11 and 12 that drive the rod. This centrifugal force is reacted by the hydrodynamic force 63 acting upon the surface of rod 14 when the fluid is being pushed by the rod. FIG. 2A is a force equilibrium diagram showing the physical nature of the balance of these force vectors more clearly. Essentially the tangential component of vector 63 is balanced by vector 61 which is directly related to the drive power supplied by motor 18. The radial component of vector 63 is balanced by the centrifugal force which is a function of the speed, diameter and density of the rod. Since the speed and the diameter of the rod also affect the characteristic of vector 63 only the density of the rod is an independent control factor.

In a complete system the summation of the centrifugal force of all of the whip rods and that of the drive plates represents a revolving disturbing force acting upon the total system to give it a shaking motion. This can be minimized by the use of a pair of counterweights 19 and 19a mounted on the shafts 17 and 17a as shown in FIG. 1.

Figure 3:
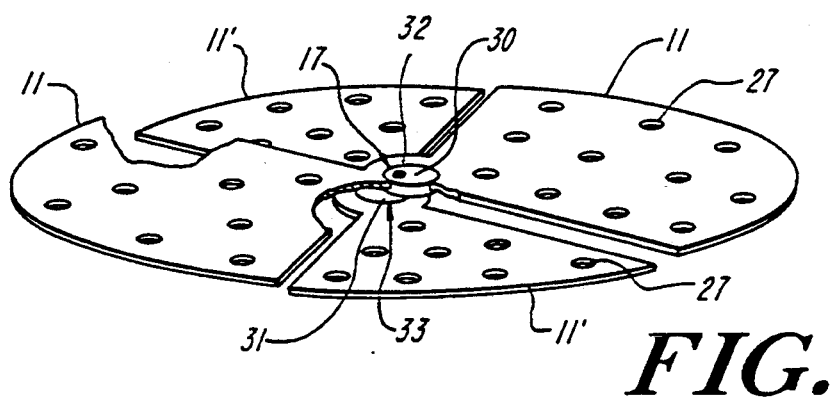
FIG. 3 is a simplified view in perspective of two pairs of diametrically opposed drive plates each drive by eccentric cranks and each adapted to engage and drive in an orbital motion a set of whip rods as shown in FIG. 1.

FIG. 3 illustrates the use of a pair of orthogonal drive plates 11,11' driven by shaft 17 via two sets of eccentric bearings 30 and 31 and their corresponding mounting brackets 32 and 33. Shaft 17a drives another set of these plates. Each plate is generally hourglass or figure 8-shaped to fill two quadrants. Plate 11 is spaced somewhat above plate 11'. Since these two eccentric bearings are oriented 180° apart and each drive plate is the same mass and carries the same number of whip rods, they tend to balance against each other without the need of external counterweights.

Figure 4:
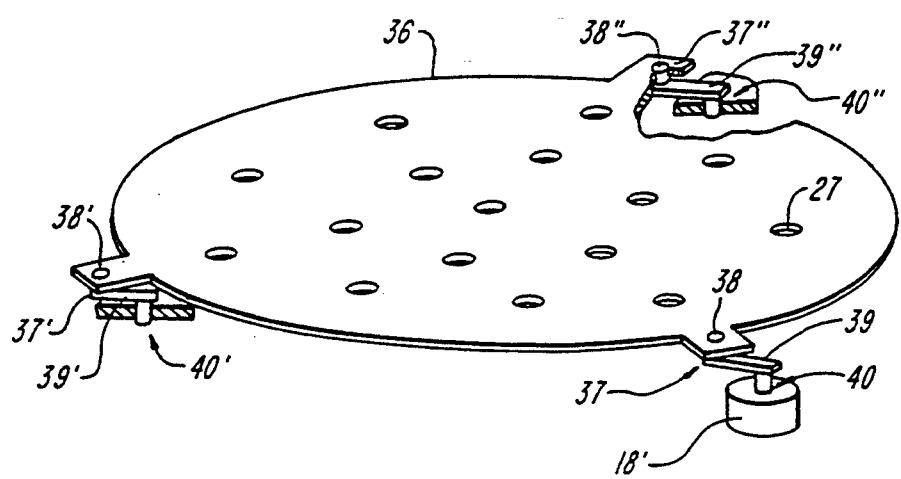
FIG. 4 is a view in perspective of an alternative orbital rod drive according to the present invention.

FIG. 4 illustrates an alternative orbital rod drive using cranks 39—a minimum of three cranks in a triangular pattern for smooth operation. In this diagram all three cranks 39, have the same radius. The bore pattern 38 of the drive plate 11" is the same as the bore pattern 12'''. All three cranks will rotate in unison by driving any one of them.

Figure 5:
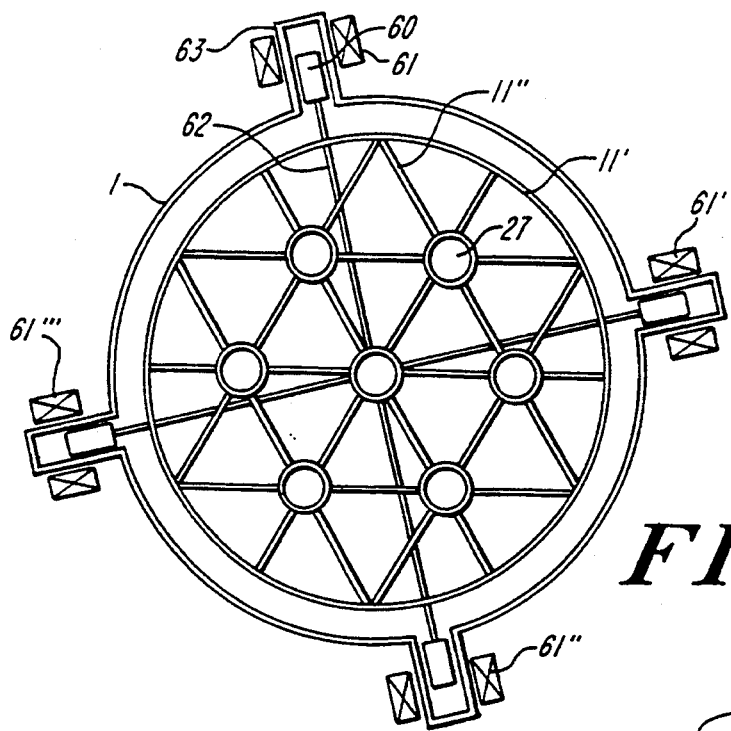
FIG. 5 is a view in horizontal section of yet another embodiment of an orbital drive according to the present invention.

FIG. 5 illustrates another embodiment of an orbital rod drive plate 11'''' that emphasizes making the plate as light as possible and with the plate offering as little restriction as possible for the flow of the media into or out from the tube. The plate 1''' is made of a structure ring 11a and webs 11b to carry ring-like drive openings 27''''. This type of drive plate is particularly suitable for the lower plate of the heat transfer apparatus 100 used as an ice slurry making machine.

FIG. 5 also illustrates a linear drive such as magnetic or electric solenoids as a pneumatic cylinder. As shown a magnetic core 60 mounted slidably inside a sealing sleeve 63 is actuated from the outside by magnetic coil 61. Four of these linear drives forms an orthogonal pair. They are coupled to the drive plates 11'''',12'''' through cables 62, and springs (not shown), so that the drive plate 11 can be driven into an orbital motion when a proper oscillatory electrical current is applied to the four coils 61.

Figure 6:
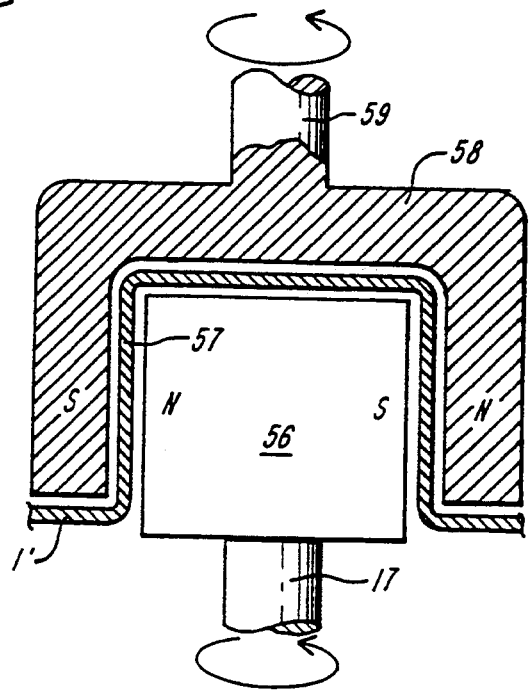
FIG. 6 is a view in vertical section of a magnetic coupling to transmit rotary power with no rotary seal.

FIG. 6 shows a conventional magnetic coupling for a sealless drive where the shaft 17 is coupled to a magnetic core 56 inside a sleeve 57 which is an integral part of the top cover 1a of the shell 1. A cup shaped magnet 58 over the sleeve 57 is drive by a shaft 59.

Figure 7:
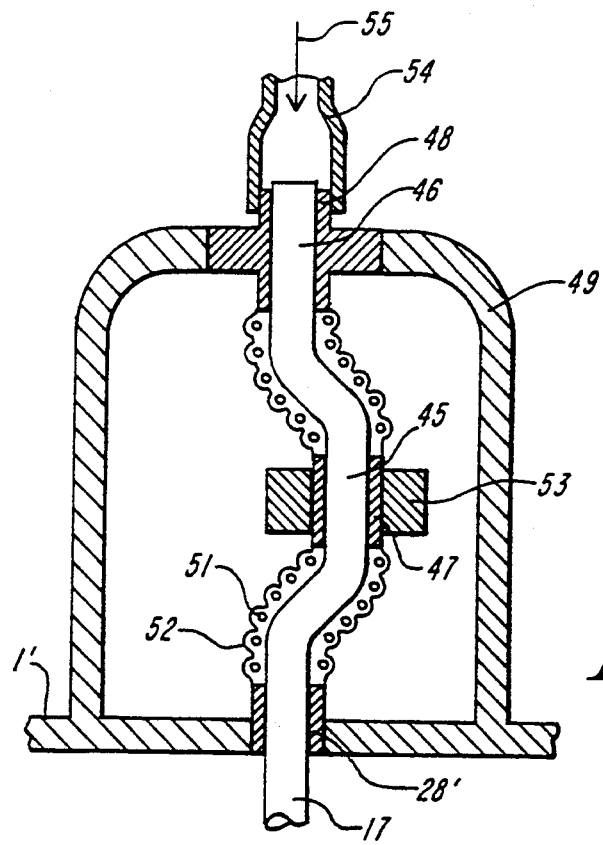
FIG. 7 is a view in vertical section corresponding to FIG. 6 showing a mechanical coupling for the transmission of rotary power with no sliding rotary seal.

FIG. 7 shows a mechanical non-sliding seal with the use of bellows or an equivalent. In essence, it is a crank covered by a flexible hose. Here the shaft 17 is driven to turn by a crank 45 and pushed by yoke 53 (as in FIG. 4) and supported by a series of bearings 28' and 48. The seal is provided by bellows 52 which is supported by rings 51. At the crank a bearing sleeve 47 is provided to transmit the cranking force. At the upper end of the crank a conduit 54 is provided to introduce some suitable fluid 55 to provide the lubrication of the bearings and aid in maintaining the seal. This fluid may be part of the feed. The bearing 48 is supported in a pair of arched support members 49,49. This seal is rotary, but not sliding. It has the advantage of a positive mechanical drive, as opposed to the magnetic drive of FIG. 6 which can lose engagement if its torque cannot move the applied load.

Figure 8:
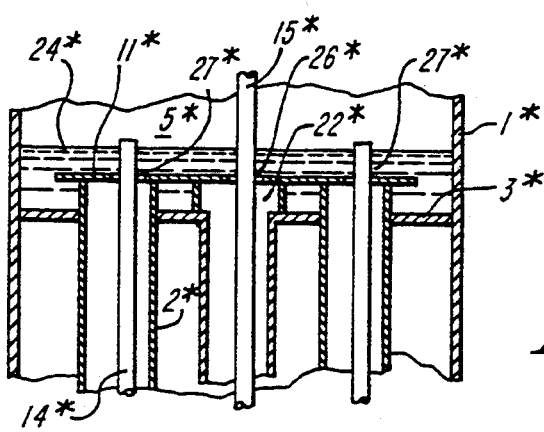
FIG. 8 is a view in vertical section of a fluid distributor system for use in the FIG. 1 embodiment.

FIG. 8 shows the use of the top drive plate 11* and its drive openings 27* and whip rods 14* to distribute the feed to flow into the heat transfer tubes 2* evenly. In this arrangement, tubes 2* are assembled to protrude above the surface of the top tube sheet 3* slightly to allow the plate 27* slide over the upper end of tube 2* to serve as a cover. Feed introduced into this chamber 5* will form a liquid pool 24* to submerge plate 11* with a predetermined depth or head which determines the flow rate into each tube through the opening 27* around the whip rod 14*. In this manner the feed serves as a lubricant for the rod inside the opening and the motion of the rod helps to prevent any clogging tendency of the openings.

Figure 9:
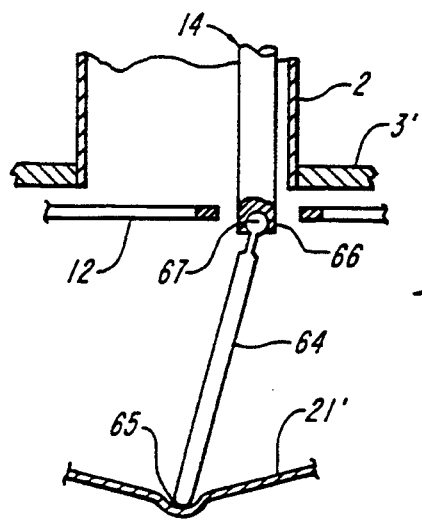
FIG. 9 is a view in vertical section of a mounting arrangement according to the present invention for the whip rods.
Figure 10:
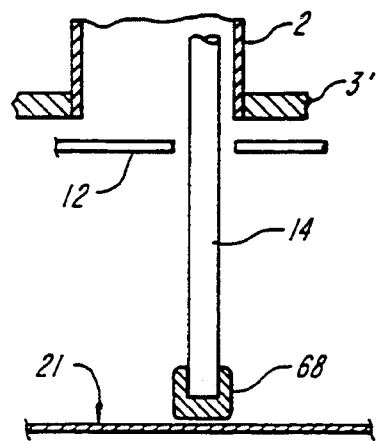
FIG. 10 is a view corresponding to FIG. 9 of an alternative rod mounting arrangement.

FIGS. 9 and 10 show two alternative arrangements for reducing sliding friction of the whip rod 14 on the plate 21. In FIG. 9, a connecting link 64 attaches to the lower end of the rod 14 in a ball 67 and socket 66 joint adapted to allow free orbital movement of the rod about the tube. The link is shown as having the ball at its upper end, but it could contain the socket. Other arrangements such as a short length of a flexible cable or a double universal joint are possible also. The lower end of link 64 is loosely engaged in a socket 65 formed in the plate 21'. The socket restrains the lower end against any significant lateral translation, but does not restrict movement of the link along a conical locus as the rod orbits. The socket 65 can also be formed as a separate, cup-like element secured on the plate 21'. This coupling could also be in the form of a short length of a flexible cable or a double universal joint, but with increased cost, fatigue or wear problems.

FIG. 10 shows a simpler arrangement. A tip 68 of a low friction material, e.g. a suitable plastic, is secured on the lower end of the rod 14. It has a reduced coefficient of friction with respect to the surface of the plate 21 than the material forming the rod 14, and therefore reduces wear and the power required to drive the rod(s).

In operation, the motor 18 drives two or more drive plates and the rods held in the drive plates through an orbital motion that produces a fluid distribution in the tubes 2 and solid removal from the inner walls of the tubes pursuant to the dynamic force analysis of FIG. 2. The flexibility of the whip rod conforms to the inner surface and effectively promotes a good heat transfer without critical alignments between the moving parts, without a deterioration of this effectiveness as parts wear, without the matching of parts to close tolerances, and without the power and mounting requirement of prior orbiting tube devices. In particular, the mass of the rods and associated moving drive parts is typically less than 10% of the mass of the moving tubes, liquid in the tubes, and other parts rigidly secured to and moveable with the tubes in prior art systems such as those described in the aforementioned '529, '963 and '592 patents. This reduces torque requirements on start-up by a factor of about five and reduces the power requirements for the motor 18 by about two. As noted above, because the rods 14 flex and whip, and because of the drive arrangement, the shortcomings of known rigid wiper and scraper systems are avoided. The reduced moving mass also facilitates scaling up, e.g. by reducing the cost and fatigue of spring mounts and vibration and balance problems of fixed crank orbiting tube arrangements.

While the invention has been described with respect to its preferred embodiments, it will be understood that various modifications and alterations will occur to those skilled in the art from the foregoing detailed description and the accompanying drawings. For example, while the whip rods have been described as loosely held in opening in a drive plate, they could be mounted in bearings, albeit at an increased cost and a reduction in fluid feed options. Also, while the whip rods have been described as free-standing on their lower ends, they could be suspended from above on a flexible cable, anchored flexibly at both ends, or supported on one or both drive plates. These alternatives are believed, however, to be less desirable since they reduce operational options, have an increased cost, or are more susceptible to fatigue and wear. The drive plates can assume a variety of forms consistent with the general design objectives and structures described herein, as can the source of motive power and its coupling to the drive plate. These and other modifications and variations are intended to fall within the scope of the appended claims.

What is claimed is:

1. An orbital drive for use in a heat transfer apparatus having (i) at least one vertically oriented heat transfer tube that receives a first fluid to be processed at its upper end and has a second fluid flow over its outer surface to produce a radial heat transfer through the wall of the tubes, and (ii) a flexible whip rod disposed in each tube and extending generally the length of the tube, comprising, a motive power source,
   means for translating the output of said motive power into an orbital motion,
   means for mechanically and positively coupling said orbital motion to said whip rod to cause it to orbit over the inner surface of said tube to distribute the first fluid and to remove solids from the inner surface deposited from the first fluid as a result of the heat transfer.

2. The orbital drive of claim 1 wherein said mechanical coupling means comprises a drive plate.

3. The orbital drive of claim 2 wherein said drive plate comprises a pair of vertically spaced, horizontally extending drive plates that couple to said rod at its upper and lower ends.

4. The orbital drive of claim 3 wherein said plates contain openings that receive said upper and lower rod ends in a loose engagement and said whip rod is free-standing on its lower end.

5. The orbital drive of claim 4 wherein there are plural whip rods and said plates each engage all of said rods.

6. The orbital drive of claim 4 wherein there are plural rods and plural plates at each upper and lower end, said plates being organized in orthogonal pairs, and wherein said translating means drives said opposed plate pairs 180° out of phase to produce a self balancing.

7. The orbital drive of claim 4 wherein said means for translating comprises at least one eccentric operatively coupled between said motive power source and each of said plates.

8. The orbital drive of claim 5 wherein said plate comprises a rigid closed loop frame member and means secured within said frame to engage said rods.

9. The orbital drive of claim 5 wherein said motive power source is a motor with a rotary shaft output.

10. The orbital drive of claim 5 wherein said motive power source is an orthogonal pair of opposed linear actuators.

11. The orbital drive of claim 4 wherein said lower rod end carries a low friction member and said drive includes a plate extending horizontally under said tube and spaced there from that said low friction member slides over during the orbiting of said whip rod.

12. The orbital drive of claim 4 wherein said whip rod is connected at its lower end to a link that is mounted to said whip rod to allow free horizontal movement and said link is held at its lower end in a fixed location while allowing a free movement of said link along a conical locus.

13. The orbital drive of claim 1 wherein there is a container surrounding said tube, said whip rod and at least said mechanical coupling means, and wherein said means for translating includes a non-rotary seal at said container between said motive power source and said mechanical coupling means.

14. The orbital drive of claim 13 for wherein said motive power source is a magnetic drive in a rotatable element located within said container and said seal includes a cup-like portion of said container that surrounds said rotatable member.

15. The orbital drive of claim 13 wherein said seal includes a flexible hose that surrounds an eccentric crank and a fluid flow into said hose.

* * * * *